Oct. 14, 1969  M. R. SCOTT  3,472,160

SURFACE HARDENED SUGAR ROLL

Filed Feb. 14, 1967

INVENTOR.
Marvin R. Scott
BY
Harness, Dickey & Pierce
ATTORNEYS.

United States Patent Office 3,472,160
Patented Oct. 14, 1969

3,472,160
SURFACE HARDENED SUGAR ROLL
Marvin R. Scott, Detroit, Mich., assignor to Detroit Flame Hardening Company, Detroit, Mich., a corporation of Michigan
Filed Feb. 14, 1967, Ser. No. 616,012
Int. Cl. B30b 3/04; C22c 37/04
U.S. Cl. 100—176    2 Claims

ABSTRACT OF THE DISCLOSURE

A sugar mill comprising upper and lower rolls at least one of which is composed of grey cast iron having teeth or serrations that are hardened by flame or induction heat treatment techniques to provide a microstructure of martensite and graphite.

BACKGROUND OF THE INVENTION

The sugar cane industry has searched continuously for generations for a better, longer-lived sugar mill roll for crushing cane to extract the juice. It is required that the roll give the best possible gripping action to prevent cane slippage while having a long, trouble-free (freedom from breakage) life and resistance to wear and corrosion. Alloying elements such as chromium, nickel, etc., commonly used to improve durability and corrosion and wear resistance of cast iron have not been satisfactory in this application because of their tendency to cause glazing of the sugar mill rolls and thereby lower the gripping action of the rolls as compared with ordinary straight carbon grey cast iron.

SUMMARY OF THE INVENTION

The invention provides a grey cast iron sugar mill roll that has teeth that are surface hardened to form a homogeneous microstructure of martensite and free graphite. The softer graphite wears away to leave a porous extremely hard martensitic surface that is durable and wear resistant and which has optimum gripping characteristics. It has been discovered that even if only one of a pair of mating rolls is hardened according to the invention greatly improved results are obtained and, accordingly, the invention also includes a pair of mating cast iron sugar-mill at least one of which is surface hardened to a microstructure of martensite and graphite.

DESCRIPTION OF THE INVENTION

Figure 1:
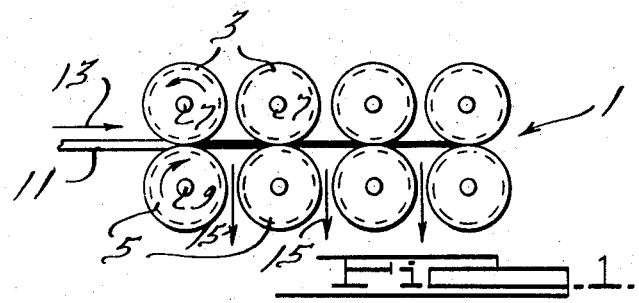
FIGURE 1 is a schematic side view of a portion of a sugar mill and shows roll stand or series of cooperating pairs of upper and lower rolls.

The sugar cane crushing roll stand 1 schematically shown in FIGURE 1 has a series of upper rolls 3 and a series of lower rolls 5 which are respectively mounted on and driven by axles 7 and 9 in a suitable and conventional manner. The mating upper and lower rolls are vertically aligned and crush the sugar cane 11 as it passes between them as well as move it through the roll stand 1 in the direction of the arrow 13. The juice squeezed out of the cane by the rolls drops down as indicated by arrows 15 where it is collected by suitable means (not shown) for further processing.

In operating a sugar mill it is desirable that the roll stand function for as long a period as possible without need for shutdown for repairs or adjustment and that the cane move through the stand as fast as possible consistent with the maximum removal of liquid. The rolls of this invention achieve both objectives because they have longer service life and greater resistance to tooth breakage and because they have improved cane gripping characteristics over conventional rolls permitting higher roll speeds thereby producing greater efficiency and reduced costs.

Figure 2:
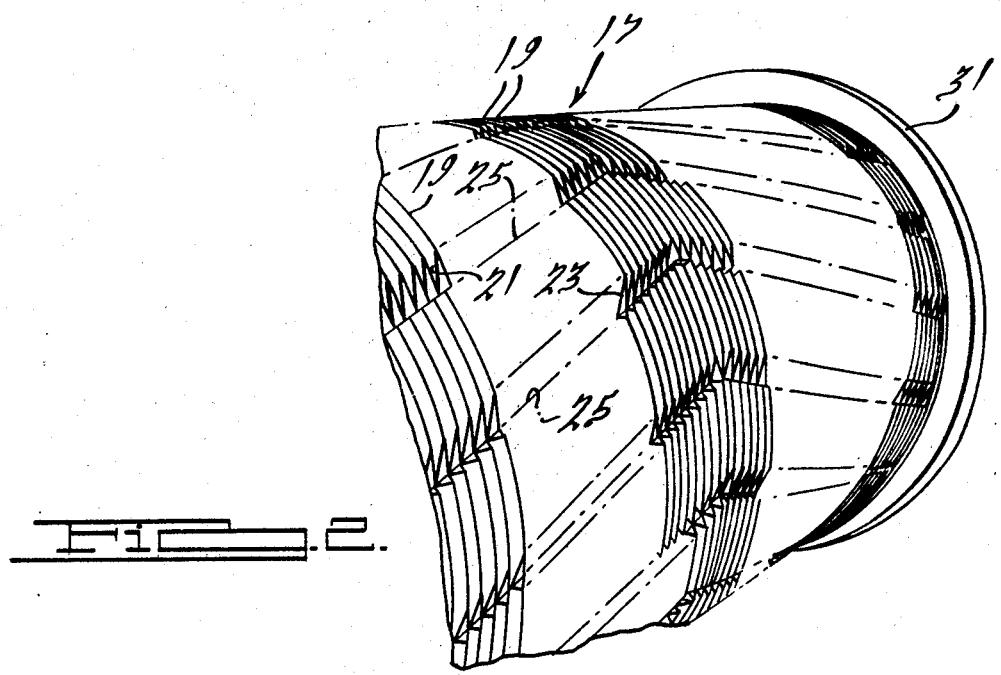
FIGURE 2 is an enlarged perspective view of a portion of a sugar roll such as may be used in the mill of FIGURE 1.

As indicated in FIGURE 2 the roll 17 (which may be one of the rolls 3 or 5) has substantially annular teeth or serrations 19 extending circumferentially around its outer surface and these are separated longitudinally from each other by juice collecting annular grooves 21. Aligned portions of the teeth 19 are of reduced diameter as indicated at 23 to provide a series of circumferentially spaced, longitudinally extending channels 25 that connect with grooves 23 and assist in the collection and extraction of liquid from the sugar cane as it is crushed. The roll 17 is of grey cast iron, preferably straight carbon (i.e. no substantial amounts of alloying elements), which is cast and machined to shape as shown or to any other desirable and suitable tooth and serration pattern and configuration.

Figure 3:
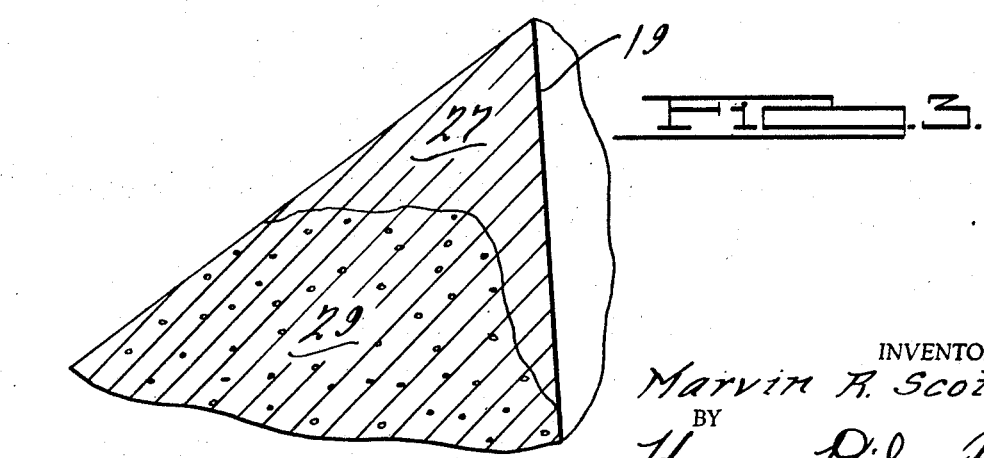
FIGURE 3 is an enlarged cross section through a portion of a tooth or serration of the roll of FIGURE 2 showing the hardened area.

In accordance with the invention all surfaces of the teeth 19 are surface hardened by flame or induction hardening techniques to produce a tooth cross sectional area 27 (FIG. 3) that comprises a substantially homogeneous microstructure consisting essentially of martensite and free graphite. The hardened layer is preferably about 0.10 inch deep and terminates above the root of the tooth. It is backed up by a core 29 that is non-martensitic but relatively tough and shock absorbent. The martensite is very hard (above about 60 Rockwell C scale) and has a high tensile strength thereby promoting long wear and inhibiting tooth breakage. The graphite, on the other hand, is soft as compared with the martensite and in operation of the rolls is soon worn away leaving a tooth surface that is very hard and porous. This produces an optimum gripping action, much superior to that of known sugar rolls, probably due to a pseudo-vacuum effect. In fact, it has been discovered that when only one of a pair of mating rolls 3 and 5 is constructed in accordance with the invention, and the other is unhardened or conventional, the service life of the unhardened roll is materially improved because of the cane gripping benefits derived from the roll of this invention. As indicated in FIGS. 1 and 2 the roll may be in the form of a shell which may have a flange 31 that serves as a means for mounting it on axles 7 or 9. The invention is applicable to such a roll, to a solid roll, or to other forms of specific roll construction.

I claim:

1. A roll for crushing sugar cane or the like comprising a cylindrical body having cane gripping teeth distributed over its outer surface, said body and teeth being integral and composed of grey cast iron, the outer surface layer of said teeth being hardened and having substantially homogeneous microstructure consisting essentially of martensite and free graphite.

2. In a roll stand for crushing sugar cane or the like, the combination of an upper roll and a lower roll mating with the upper roll, each roll comprising a cylindrical body having cane grapping teeth distributed over its outer surface, said body and teeth being integral and composed of grey cast iron, at least one of said rolls having the outer surface layer of the teeth thereof hardened to provide a substantially homogeneous microstructure consisting essentially of martensite and free graphite.

References Cited
UNITED STATES PATENTS

| | | | |
|---|---|---|---|
| 1,856,484 | 5/1932 | Kay | 100—166 |
| 2,129,683 | 9/1938 | Gontermann et al. | 29—132 X |

PETER FELDMAN, Primary Examiner

U.S. Cl. X.R.

29—132; 148—35, 141